United States Patent [19]
Brewer

[11] 4,150,588
[45] Apr. 24, 1979

[54] DYNAMIC VIBRATION ABSORBER
[75] Inventor: Given A. Brewer, Marion, Mass.
[73] Assignee: Brewer Engineering Laboratories, Inc., Marion, Mass.
[21] Appl. No.: 755,268
[22] Filed: Dec. 29, 1976
[51] Int. Cl.² ............................................. F16F 15/00
[52] U.S. Cl. ................................. 74/574; 248/638; 248/592
[58] Field of Search ...... 74/574; 248/358 R, 358 AA, 248/20, 21, 22, 23; 416/500, 145, 134 R, 144

[56] References Cited
U.S. PATENT DOCUMENTS

| | | | |
|---|---|---|---|
| 1,855,570 | 4/1932 | Edison | 123/192 R |
| 3,669,566 | 9/1972 | Bourquardez et al. | 416/134 |
| 4,088,042 | 5/1978 | Destardins et al. | 74/574 |

Primary Examiner—Samuel Scott
Assistant Examiner—Don E. Ferrell

[57] ABSTRACT

This invention relates to suppression of vibrations in massive systems including large rotating elements such as induction fan rotors used in electric power generating plants. In particular, this invention relates to the provision of a tuned vibration absorber with very low damping, often known as a dynamic vibration absorber, which acts to reduce or suppress the vibration of a system having a resonant frequency near its operating frequency.

13 Claims, 16 Drawing Figures

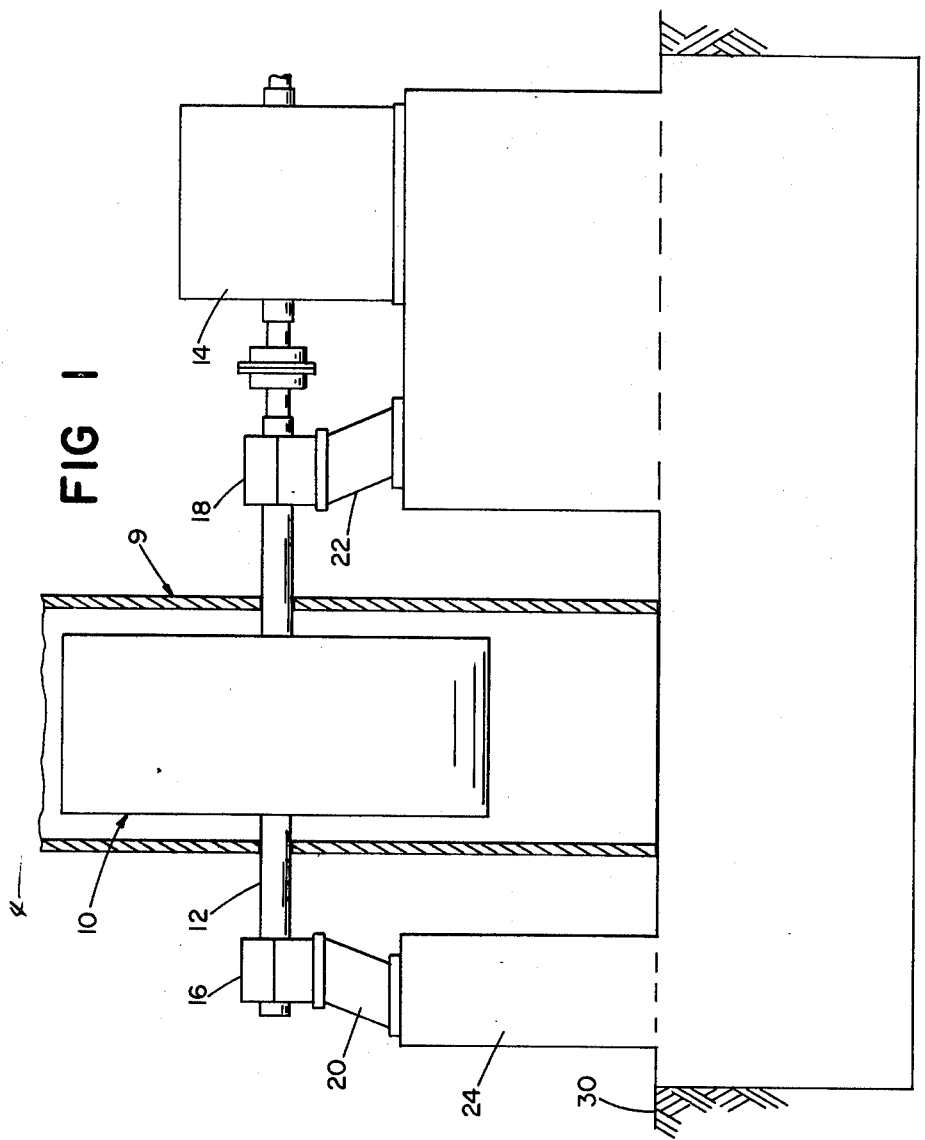
FIG 1
FIG 2
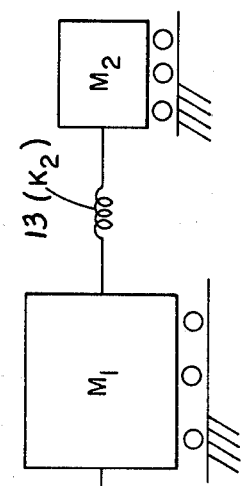
FIG 3

(A)

(B)

(C)

DYNAMIC VIBRATION ABSORBER

Large rotating elements, particularly such elements as exhaust fan rotors used in electric power generating plants, are unbalanced in operation due to their exposure to varying temperatures. Such unbalanced elements when rotating introduce large disturbing forces which cause the entire system to vibrate. If the system has a natural or resonant frequency near the operating frequency of the rotating element, such vibrations can be sufficiently severe to damage the equipment if the system is not shut down. Because of thermal distortions, it is often impossible to balance the rotating element with sufficient accuracy to reduce the vibrations to an acceptable level. On the other hand, to construct sufficiently massive foundations to hold the vibrating system steady is likely to be prohibitively expensive. Such problems are more acute in peak load power plants, which require daily starts and stops as well as rapid variations in power output.

This invention contemplates the provision of a vibration absorber, or number of such absorbers, with very low damping, secured to the foundation of the system and having a natural or resonant frequency at the operating frequency of the rotating element. Such an absorber will at the operating frequency vibrate to exert a force that is 180 degrees out of phase with the unbalance force caused by the rotating element, and will effectively cancel the unbalance force on the foundation, thereby providing an effectively rigid or fixed foundation.

Tuned vibration absorbers are in principle well known. For example, Chapter 6 of the "Shock and Vibration Handbook" edited by Harris and Crede (McGraw-Hill, 1961) describes the general theory of such absorbers, with and without damping, together with some schematic showings of particular applications. In addition, U.S. Pat. No. 989,938 to Frahm (1911) describes such devices in general, with a particular example of a device applied to reduce vibrations on a ship. Vibration absorbers, tunable by adjusting spring length and designed to vibrate in three dimensions, are used as aircraft cabin engine noise suppressors as disclosed in U.S. Pat. Nos. 2,490,550 and 3,487,888.

However, in practice there are many difficulties in constructing a suitable tuned vibration absorber for a particular application such as the system described herein.

The vibration absorber of the invention is designed to reduce or suppress vibrations of a system including a massive foundation (of the order of 1 million pounds) supporting a rotating element weighing of the order of 40,000 pounds. The system has a resonant frequency at or near the range of usual operating speeds, and the rotating element has a variable and unpredictable unbalance during normal operation and cannot in practice be balanced.

The unbalance force of the rotating element is transferred to the massive foundation through the bearings and causes unacceptable vibration, principally in one dimension, and excessive bearing loads.

A suitable vibration absorber for use with such a system must therefore be constructed to reduce vibrations selectively in a particular dimension while not itself introducing vibrations in the other dimensions. Such vibrations might themselves act as disturbing forces on the entire system and cause unacceptable or damaging vibration of the equipment. It is therefore desirable to provide a vibration absorber that reduces vibrations selectively in one mode of vibration without introducing vibrations in other modes. It is also desirable that the absorber not introduce vibrations at frequencies below operating frequency, that is, during starting and stopping the rotating element.

In order to provide an effective vibration absorber, it is desirable that the absorber have a Q or 30 or more, that is, very low damping.

It is also desirable that a vibration absorber be tunable to within about 0.1 Hz, to permit the absorber to be accurately tuned to the operating frequency of the rotating element.

In addition, it is desirable to provide a vibration absorber that can reduce vibrations to acceptable levels in a system of the type described at a cost substantially below that of constructing a foundation sufficiently massive to accomplish the same purpose.

Accordingly, it is an object of this invention to provide a tuned dynamic vibration absorber or absorber system suitable for use with massive installations including a foundation and a large rotating element that in operation exerts periodic unbalance forces on the foundation, the installation having a resonant frequency at or near the operating frequency. It is a further object to provide such a vibration absorber that is accurately tunable to within about 0. Hz, that has a Q of 30 or more (low damping), and that provides an effectively rigid foundation at relatively low cost.

The invention features a dynamic vibration absorber in combination with an unbalanced rotor supported on a shaft journaled in a bearing for rotation about an axis of rotation. The bearing is fixed to a foundation. The rotor has a generally fixed operating frequency of rotation, and in operation exerts a periodic disturbing force on the foundation. The periodic displacement of the foundation responsive to the periodic disturbing force is primarily in one displacement direction (lateral) and its amplitude approaches a maximum approximately at the rotor fixed operating frequency.

The dynamic vibration absorber is rigidly connected to the foundation and comprises a vertical integral steel spring member having an upper spring portion, a fitting end portion, and an enlarged lower supporting portion rigidly mounted on the foundation, the fitting end portion being adapted to support a weight. The absorber further comprises a weight rigidly mounted on the spring member fitting end portion; the axis of rotation of the shaft lies in a horizontal plane passing through the weight. The upper spring portion has a vertical dimension, a first horizontal dimension parallel with the displacement direction, and a second horizontal dimension perpendicular to the first horizontal dimension. The second horizontal dimension is at least three times as great as the first horizontal dimension, increasing the stiffness of the support spring portion for bending perpendicular to the displacement direction. The weight has a mass at least one-tenth that of the mass of the rotor.

The weight and the spring dimensions are such that at the rotor operating frequency, the weight vibrates in the displacement direction; the amplitude of the vibration approaches a maximum at the rotor operating frequency. The absorber thereby exerts a periodic restoring force on the foundation opposite in sense to that exerted by the rotor and thereby reduces the amplitude of the periodic displacement of the foundation.

Other objects, features and advantages will appear from the following description of a preferred embodiment of the invention, taken together with the attached drawings thereof, in which:

FIG. 1 is a view of the fan-foundation system;

FIG. 2 is a view taken on the line 2—2 of FIG. 1;

FIG. 3 is a schematic view of the vibrating portions of the system;

Figure 4:
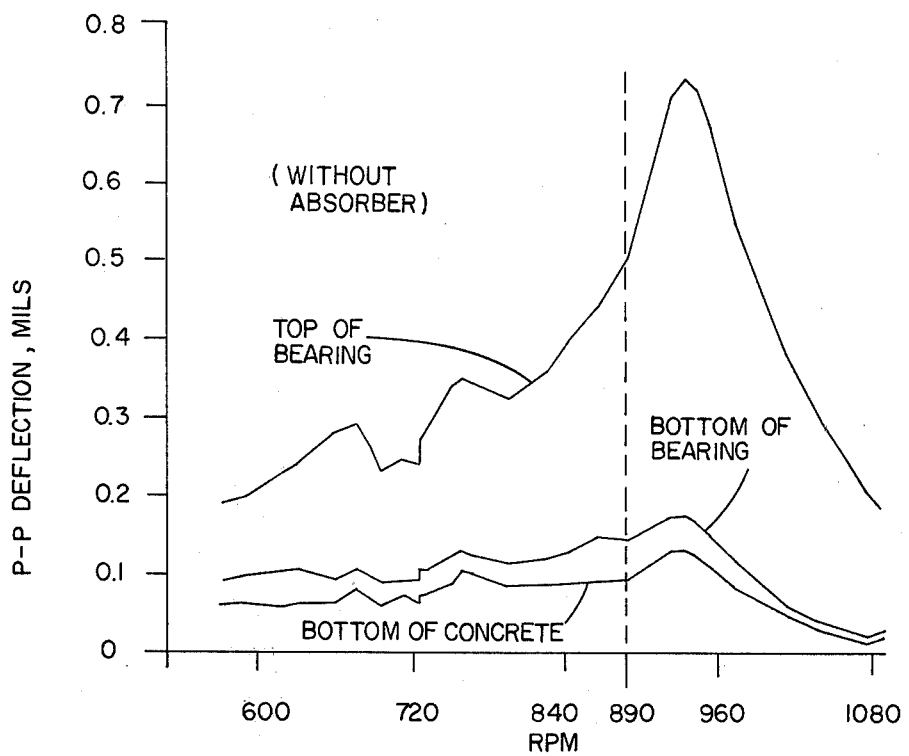
FIG. 4 is a graph of deflection of portions of the system against frequency, without the vibration absorber of the invention.

Referring now to the drawings, FIG. 1 shows an induced draft exhaust fan actually in use in a 380 megawatt fossil fuel electric power plant at Newington, N.H. The fan 10, in a housing 9, rotates on a shaft 12 that is turned by motor 14. Shaft 12 is supported at its ends by oil film bearings 16 and 18. Each bearing rests upon a steel pedestal 20, 22, which are supported on a concrete foundation 24. The foundation is sunk into the soil 30. FIG. 2 shows the outboard bearing 16 end on.

The fan rotor is about ten feet in diameter and weighs about 47,500 pounds, while the concrete foundation weighs about 1,160,000 pounds. FIG. 3 schematically illustrates the system. The mass $M_1$ is the mass of the foundation; because the foundation is not rigidly fixed to the earth, it is represented as connected to the earth by a spring 11 of spring constant $K_1$. The mass $M_2$ represents the mass of the fan rotor (the masses of the bearing and pedestal are small enough so that they are neglected), which is connected to the foundation by an effective spring 13 of spring constant $K_2$, representing the connection of the rotor to the shaft, the shaft to the bearing through the oil film, the bearing to the pedestal, and the pedestal to the foundation.

As a result of the non-rigid connection represented by the spring 11 in FIG. 3, the foundation can oscillate with respect to the earth in which it is supported. The foundation alone (neglecting the rest of the structure) has a resonant frequency near 26.9 Hz.

The fan operates over a range of temperatures from ambient to 600° F. As a result of unbalance in the fan rotor, which is particularly affected by ambient temperature changes during operation, the center of mass of the rotor moves during operation, causing the shaft 12 to bend between its two supporting bearings. The shaft and fan of the Newington installation have a resonance in bending at about 18.4 Hz. The unbalance of the fan rotor ultimately exerts a periodic driving force on the foundation 24.

The entire fan-foundation system of the Newington power plant has a resonant frequency at 15.4 Hz (924 rpm), which is very close to the fan operating speed of 14.83 Hz (890 rpm). As a result, both bearing and foundation vibrate severely at the operating rpm, as seen in FIG. 4, representing actual diagnostic test results made on the system. The vibration is primarily in a direction transverse to the axis of rotation.

The fan rotor can be balanced when cold but when heated during operation to about 500 degrees F. it becomes unbalanced and the system exhibits unacceptable levels of vibration. The fan rotor can also be balanced for a particular operating temperature, but since the fan must operate over a range of temperatures the rotor becomes unbalanced and the system is subjected to damaging vibrations. Since the Newington plant is intended to supplement other power sources under peak conditions, the system is frequently started up and shut down in order to rapidly vary the output of the plant, making these problems particularly acute.

The forces on the bearings could be reduced if the foundation could be made effectively rigid. To achieve this directly would require replacing the foundations, at great cost, and preventing operation of the plant for a long time. However, according to the present invention, an effectively rigid foundation has been achieved at greatly reduced cost, by means of a tuned dynamic (low damping) vibration absorber.

Figure 5:
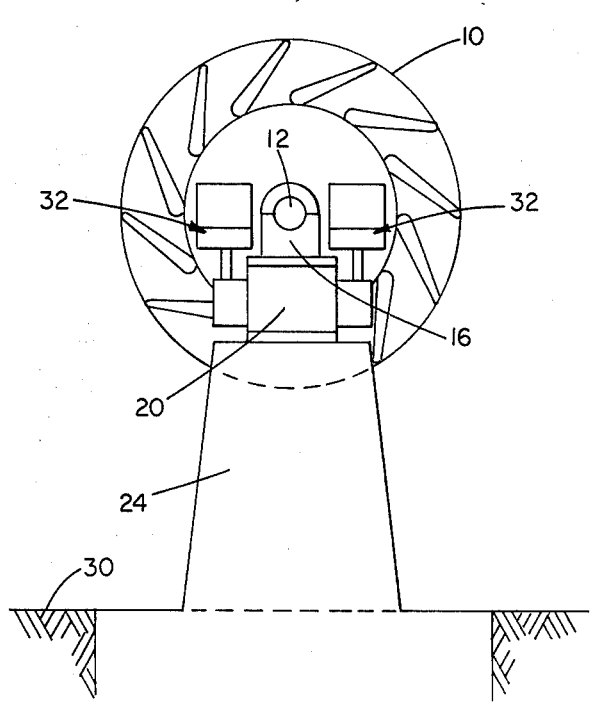
FIG. 5 is similar to FIG. 2 but shows two vibration absorbers secured to the fan-foundation system according to the invention.
Figure 7:
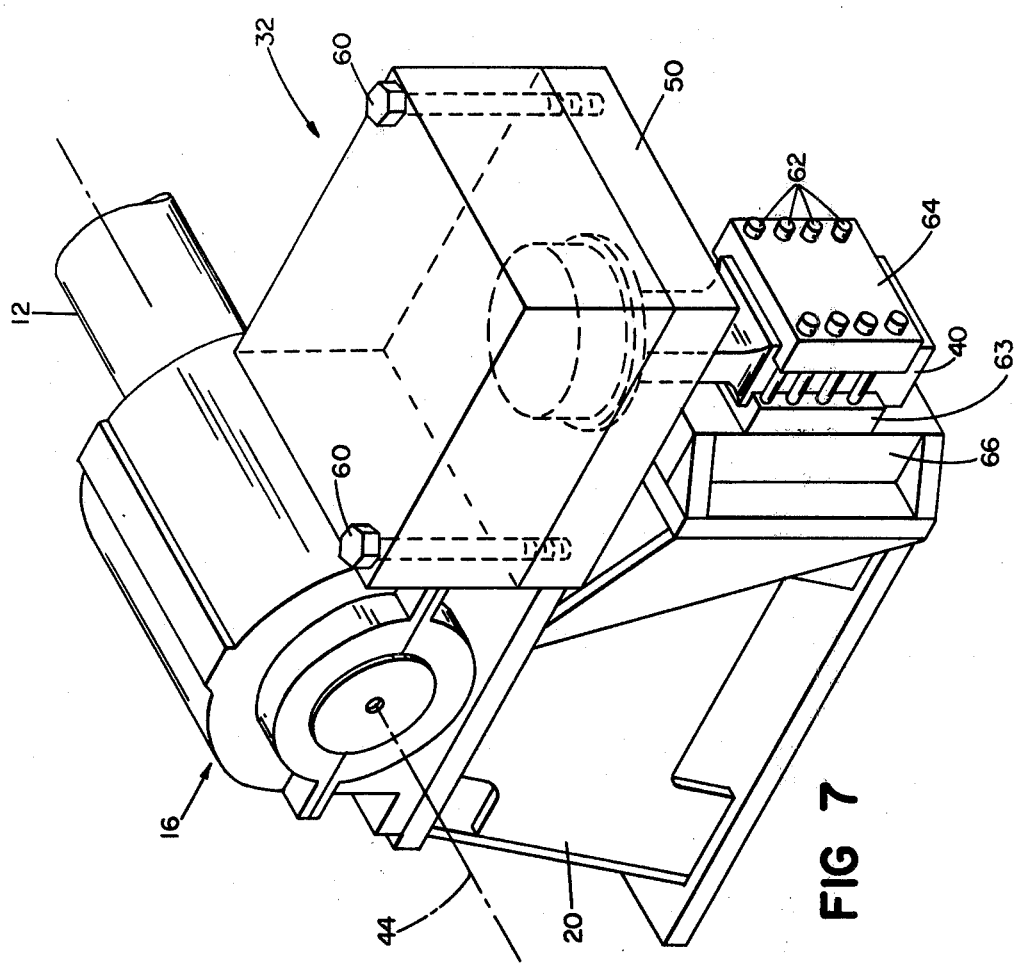
FIG. 7 is an isometric view of a vibration absorber secured to the fan-foundation system according to the invention.

According to the present invention, a dynamic vibration absorber 32 is secured to the pedestal 20 of the system (FIG. 7). Two such absorbers are shown in FIG. 5, secured on opposite sides of shaft 12. However, useful results have been obtained at the present time with a single absorber tuned to the operating frequency of the Newington power plant system.

Figure 6:
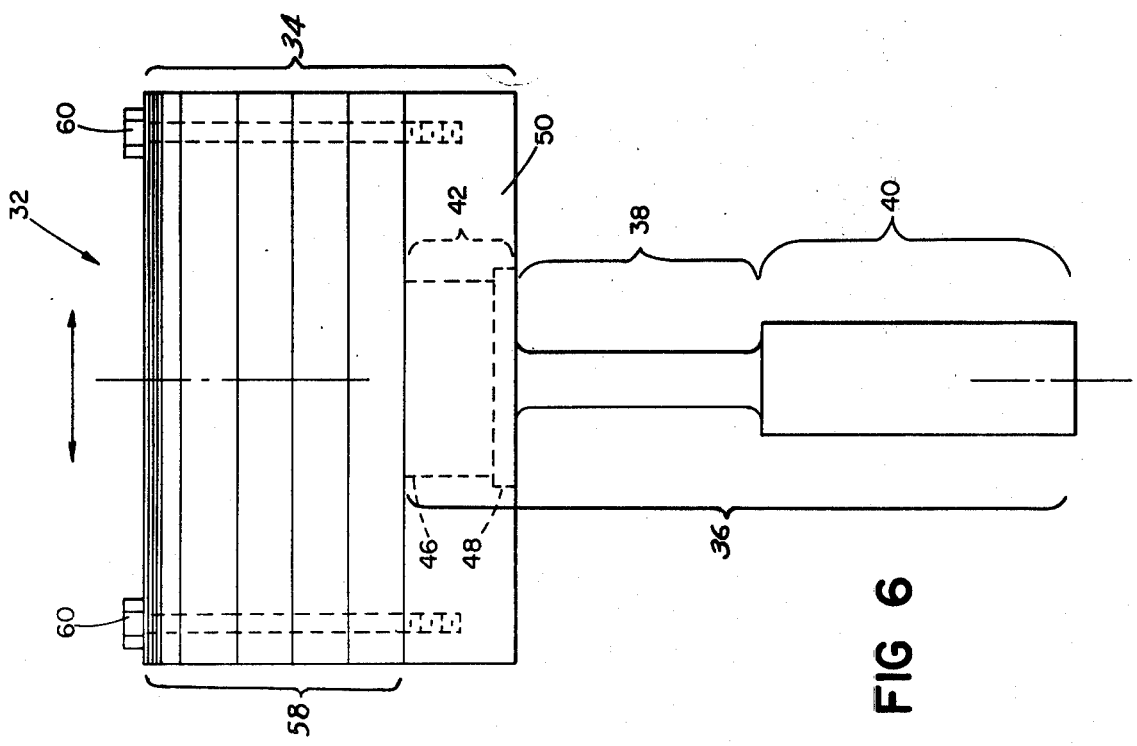
FIG. 6 is an elevation of a vibration absorber according to the invention.
Figure 8:
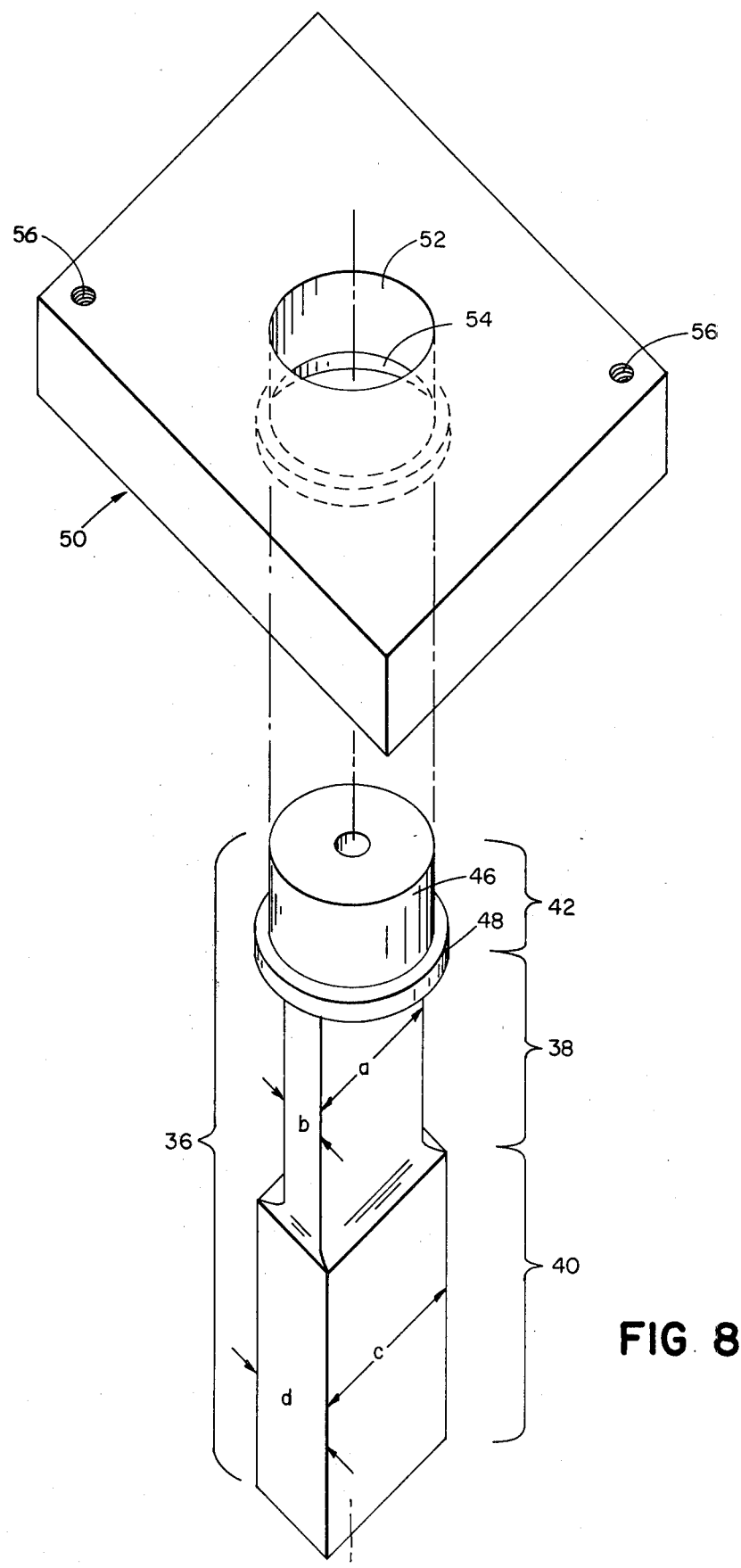
FIG. 8 is an exploded detailed view of a portion of a vibration absorber according to the invention.

Referring now particularly to FIGS. 6, 7 and 8, the vibration absorber comprises generally a mass 34 and a spring member 36. The spring member 36 comprises an upper spring portion 38, a lower support portion 40, and a mass support fitting end portion 42.

The spring portion 38 is of generally rectangular cross section, having a first or axial dimension "a" parallel with the axis of rotation 44 of shaft 12 and a second or lateral dimension "b" perpendicular to the axial dimension. The lower support portion 40 is likewise generally rectangular in cross section, having an axial dimension "c" and a lateral dimension "d".

If a spring member of uniform cross section is employed, clamped at its lower end to the pedestal, it is found in practice that unacceptable variations is effective spring length occur, making it difficult to tune the absorber accurately. It is also found that the natural frequency of the absorber is sensitive to unavoidable variations in the clamping force. The dimensions of the lower support portion 40 therefore are chosen to be both greater than the dimensions of the upper spring portion 38. These proportions insure that slight variations in the exact position and pressure of the clamp attaching the vibration absorber to the bearing pedestal have negligible effect upon the effective length of the spring and therefore on the natural frequency of the absorber.

The axial dimension "a" of the upper spring portion 38 is preferably at least three times as great as the lateral dimension "b". These proportions result in a vibration absorber that is tunable to have a resonant or natural frequency in the range of operating frequencies of the fan for lateral vibrations (toward and away from the axis 44); however, the absorber has a resonant frequency well removed from the operating range for axial vibrations (parallel with axis 44) and for torsional vibrations, as will be discussed in more detail.

Spring member 36 is preferably made of high grade, high alloy, electric steel; such material does not readily lend itself to welding. Therefore rigid non-welded connections to the weight and foundation must be provided.

The spring member 36 provides a mass support fitting 42 at its upper end. This fitting 42 comprises a generally cylindrical portion 46 with a base flange 48 of slightly greater diameter than cylindrical portion 46. The diameters of the cylindrical portions are greater than the dimensions of the spring member.

A base plate 50 of carbon steel has a central bore 52 with an enlarged base area 54. Plate 50 is secured to fitting portion 42 by a double interference fit between cylindrical portion 46 and bore 52, and between flange 48 and area 54. Plate 50 has two drilled and tapped holes 56 at diametrically opposed corners.

As seen in FIG. 6, additional plates 58 are secured to base plate 50 and are held in place by through bolts 60 which enter holes 56 in base plate 50, to comprise mass 34. The total weight of mass 34 is preferably from at least 1/10 to ¼ of the weight of the rotating mass. In the actual Newington system, each absorber has a mass of about one-tenth the mass of the rotor 10. The particular mass (and the length of the spring 38) is a function of the range of operating frequencies of the rotating mass. The equation relating mass and spring length to the operating frequency of the fan is derived in the following manner. For details of the mathematical treatment, "Dynamics or Mechanical and Electromechanical Systems", ed. Crandall, McGraw-Hill 1968, may be referred to, at pp. 216-221.

Figure 16:
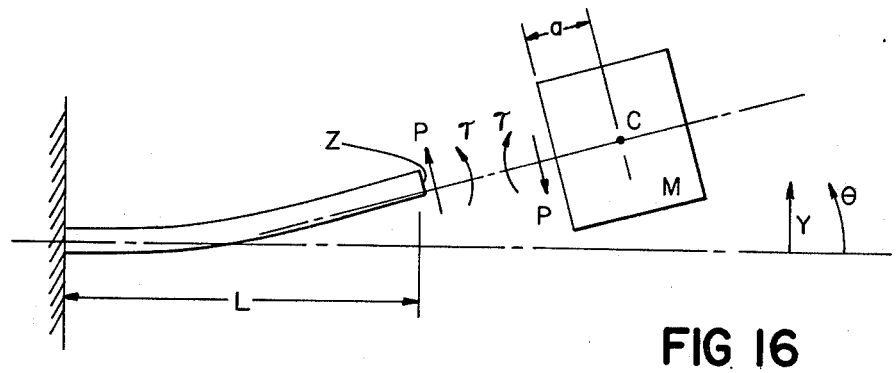
FIG. 16 is a general mathematical model of an absorber.

Referring to FIG. 16, the absorber system is modeled as a massless cantilever beam of lenth L with one end fixed and the other end free as shown. At the free end, apply a force P and a torque $\tau$ that are due to a block of mass M, the absorber mass, attached rigidly to the end of the beam. The beam is relatively short and stubby compared to the dimensions of the block, so shear and bending of the beam are included. The following equations describe the beam motions and the force P and torque $\tau$ causing the motions:

$$y = \left[\frac{L^3}{3EI} + \frac{1.2L}{GA}\right]P + \frac{L^2}{2EI}\tau$$

$$\theta = \frac{L^2}{2EI}P + \frac{L}{EI}\tau$$

$$P = -M(\ddot{y} + a\ddot{\theta})$$

$$\tau = -Ma\ddot{y} - J_A\ddot{\theta}$$

Assuming sinusoidal solutions for y and $\theta$, these equations yield a quadratic equation in $\omega^2$, the natural frequencies of the beam and mass. The equation is:

$$\omega^4\left\{\left[\frac{MaL^2}{2EI} + \frac{J_ZL}{EI}\right]\left[M\left(\frac{L^3}{3EI} + \frac{1.2L}{GA}\right) + \frac{MaL^2}{2EI}\right] - \left[\frac{ML^2}{2EI} + \frac{MaL}{EI}\right]\left[Ma\left(\frac{L^3}{3EI} + \frac{1.2L}{GA}\right) + \frac{J_ZL^2}{2EI}\right]\right\} - \omega^2\left\{M\left(\frac{L^3}{3EI} + \frac{1.2L}{GA}\right) + \frac{MaL^2}{EI} + \frac{J_ZL}{EI}\right\} + 1 = 0,$$

where E is Young's modulus, I is the moment of inertia of the beam in bending, G is the shear modulus of the beam material, A is the cross sectional area of the beam, and J is the rotational moment of inertia of the block. The remaining quantities are indicated on FIG. 16. The subscript Z refers to the center point of the end of the beam, indicated in FIG. 16. Therefore $J_Z$ is the rotational moment of inertia of the block about point Z, and $$J_Z = J_C + Ma^2,$$

where C is the center of gravity of the block.

Solving for $\omega^2$, two values for $\omega^2$ and, hence, $\omega$ are obtained; these are the two system natural frequencies. The lower frequency is of interest in this application. If this equation is solved for $\omega = 14.83$ Hz, combinations of values of M and L may be calculated (for given values of the other parameters) that will provide an absorber having the desired natural frequency. Physical limitations of the actual installation impose limits on the possible values of M and L. Such physical limitations include the distance from the point of attachment of the absorber to the pedestal to the center line of the bearing, since it is desirable to have the damper mass as close as possible to the intersection of the horizontal and vertical centerlines of the bearing. Another limitation is the space required for a large weight.

In practice, it is desirable to be able to tune the absorber to within about ±0.1 Hz. In the particular embodiment herein described, this is achieved by having the following set of plates comprising weight 34:

| | | |
|---|---|---|
| One Base Plate, 6" × 30" × 24" | | 1,200 pounds |
| Four 3" Plates | (same plan) | 2,400 pounds |
| One 1" Plate | (same plan) | 200 pounds |
| Four ¼" Plates | (same plan) | 200 pounds |
| | Total | 4,000 pounds |

Adding or subtracting a quarter-inch plate changes the natural frequency of the absorber by 0.17 Hz. Adding or subtracting a half-size quarter-inch plate will change the natural frequency by 0.08 Hz.

The mass of the absorber is about 4,000 pounds. Slight variations in spring dimension will affect the actual mass required for resonance at 14.8 Hz. Variations in width or length of the active section of the spring from the nominal size will change the natural frequency of the damper by the 3/2 power of the change. This is then corrected by adding or subtracting small amounts of mass. Hence, in practice, the damper mass may vary from 3,950 to 4,050 pounds.

For the particular Newington installation described herein, having a fan rotor which rotates at operating speeds near 14.83 Hz and weighs about 47,500 lb, supported on a foundation weighing about 1,160,000 pounds, a preferred embodiment of the vibration absorber has a spring member 36 of the following dimensions:

a=9.00 inches
b=2.87 inches
c=10.0 inches
d=6.0 inches
diameter of portion 46=10.5 inches
diameter of flange 48=11.5 inches
thickness of plate 50=6.0 inches
axial dimension of plate 50=24.0 inches
lateral dimension of plate 50=30.0 inches
length of spring portion 38=13.5 inches
length of support portion 40=17.0 inches The total weight of mass 34 is nominally 4,000 pounds or about one-tenth of the weight of rotor 10. With these specific dimensions, the natural frequency of the absorber in the lateral direction is 14.83 Hz, in the axial direction is 37.8 Hz, and in torsion is 34.7 Hz. These latter two frequencies are thus well removed from the operating frequency of 14.83 Hz.

Referring to FIG. 7, support portion 40 is clamped between fixed bracket plate 63 and clamping plate 64 by eight one-inch bolts 62. The bolts are tightened to a torque value 300 ft.-lb. to exert a pressure of 169,646 pounds on support portion 40. Bracket plate 63 is welded to side plate 66 which is in turn welded to pedestal 20.

Preferably, the absorber is secured in a position such that the center of mass of the absorber weight is in the same horizontal plane as the axis of rotation of the rotor. If the absorber is not so positioned, its vibration does not act precisely to cancel the unbalance force of the rotor; instead the two forces form a couple acting on the pedestal and causing it to rock on the foundation.

The interference fit between spring member fitting portion 42 and base plate 50, the attachment of plates 58 to base plate 50 by means of bolts 60, and the method of clamping support portion 40 to pedestal 20 all provide connections that have extremely high friction, and therefore insure that the vibration absorber in operation will have a relatively high Q. The particular embodiment described herein is found to have a Q or 30. For a lower Q, a greater absorber mass is required to achieve the same effect.

Figure 9:
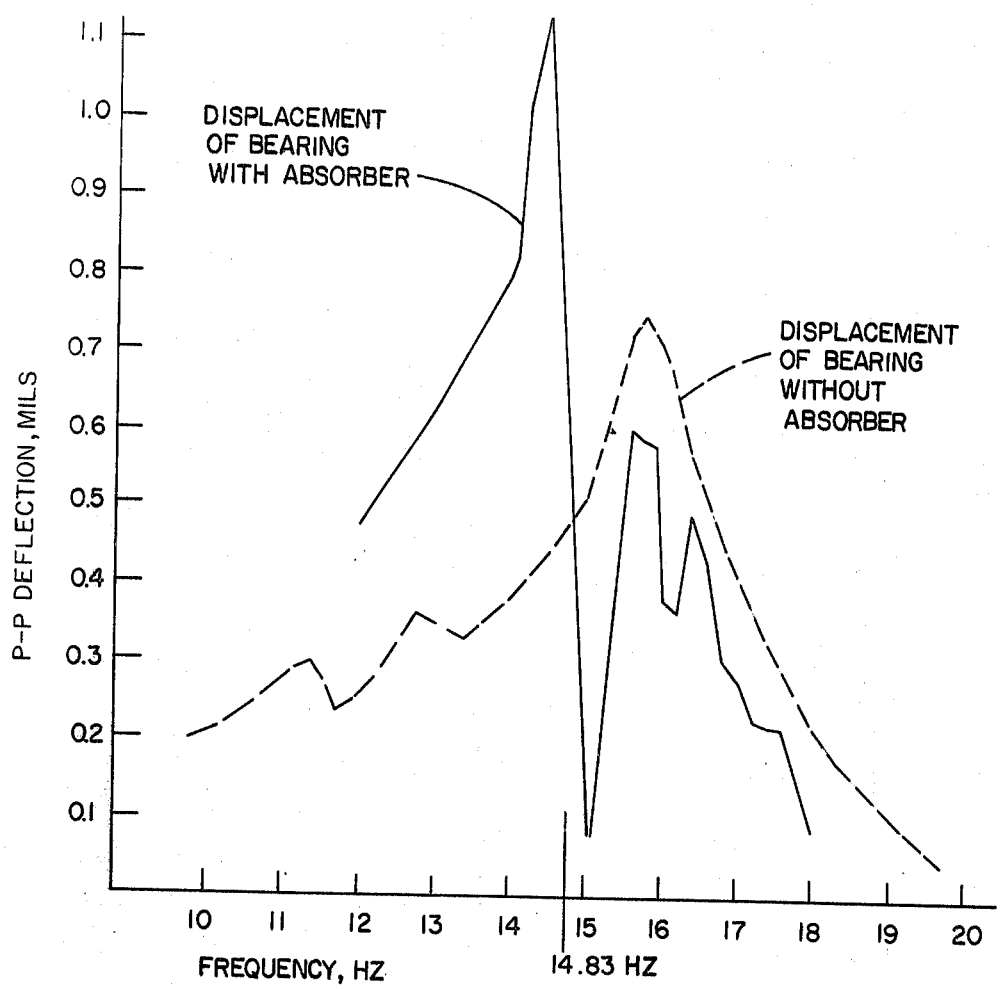
FIG. 9 is a graph of deflection against frequency illustrating the observed effect of attaching a vibration absorber according to the invention.

Referring now to FIG. 9, results are shown for the particular case described herein, when a single absorber of mass 4,000 pounds and dimensions as given is connected to the bearing pedestal in the manner described. The displacement of the bearing (in mils) without the absorber, shown in FIG. 4, is compared with the displacement of the bearing with a single absorber attached to the pedestal and tuned to vibrate in the lateral direction with a resonance at the operating frequency of 14.83 Hz. As is seen, the system with the addition of the absorber has now two resonant frequencies, one on either side of the operating frequency. As a result, vibration of the system at or near operating frequency is greatly reduced.

Figure 10:
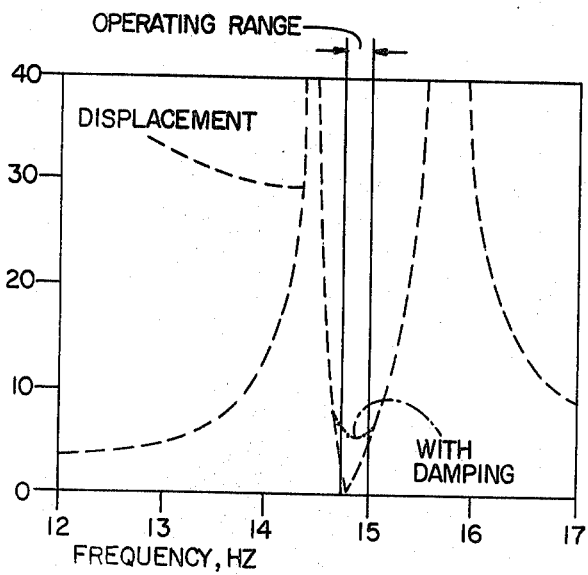
FIGS. 10 and 11 are graphs illustrating the theoretical effect of the addition of absorbers of 4,000 and 16,000 pounds respectively to the fan-foundation system.
Figure 11:
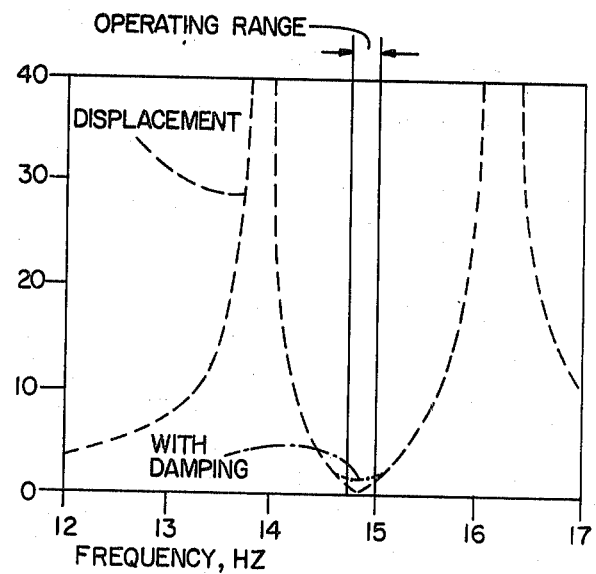

FIGS. 10 and 11 are based on theoretical calculations and show a plot of a dimensionless quantity representing the ratio of bearing displacement to the displacement due to the unbalance force (also called a transfer ratio) against frequency (Hz). FIG. 10 shows the theoretical result for the Newington fan-foundation system described herein when a single 4,000 lb absorber is employed. This result resembles the actual result shown in FIG. 9. As is seen, the addition of one appropriately tuned vibration absorber of 4,000 lb in effect separates the system resonance into two resonances, one displaced to either side of the operating frequency range of the system. FIG. 11 shows the theoretical result when the absorber mass totals 16,000 lb. With this mass, the two resonances are separated still further, leaving a wider range of frequencies near the operating range at which vibration of the system is greatly reduced.

The dotted portions of the graphs of FIGS. 10 and 11 labeled "with damping" represent estimates of the effect on the system of a small amount of damping (Q=50) in the vibration absorber. As is seen from the drawing, the absorber is not as effective when there is damping, but in practice damping cannot be completely eliminated, and consequently the theoretical minimum cannot be attained in practice.

A single 16,000 lb absorber would produce the desired result of FIG. 11 if it were possible to connect it completely rigidly to the two bearings 16 and 18. However, in practice this cannot be done. Two 8,000 lb absorbers could be used, but space limitations of the Newington installation made it impossible to get such large masses in line with the bearing centerline. Consequently, four 4,000 lb absorbers are desirably employed, two secured to outboard bearing 16 as seen in FIG. 5, while two others are secured to inboard bearing 18.

Figure 12:
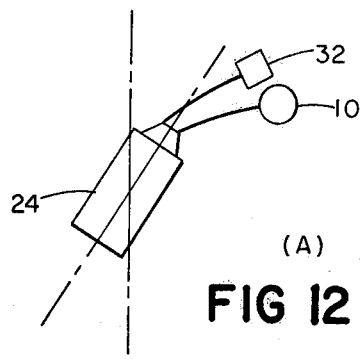
FIGS. 12, 13 and 14 illustrate schematically mode shapes of the vibration of the fan-foundation system including an absorber, at particular frequencies.
Figure 13:
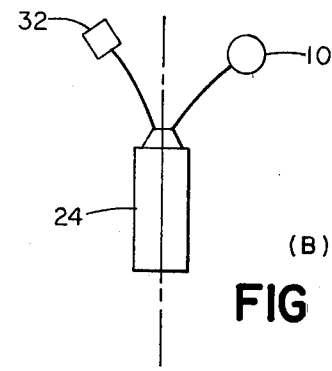
Figure 14:
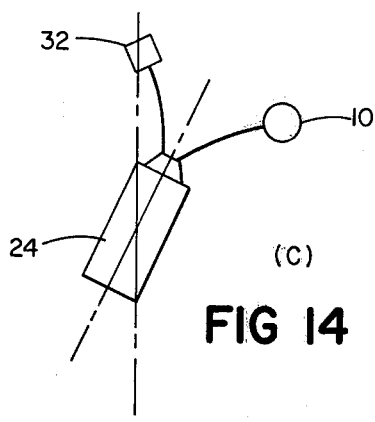
Figure 15:
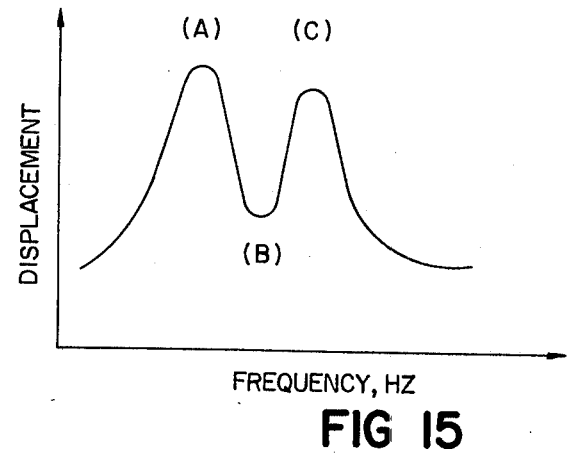
FIG. 15 is a schematic illustration of deflection against frequency including the particular frequencies corresponding to FIGS. 12, 13 and 14.

FIGS. 12 through 15 schematically illustrate the action of the absorber in combination with the rotor and the foundation. FIG. 17 shows schematically displacement plotted against frequency; the first maximum, labeled A, represents a system resonance that occurs when rotor 10 and absorber 32 vibrate in phase with each other and with foundation 24, as seen in FIG. 12. At the local minimum labeled B on FIG. 16, rotor 10 and absorber 32 vibrate out of phase with each other and in effect create an ideal foundation; foundation 24 does not move and is the equivalent of an infinitely massive foundation (FIG. 13). At the maximum C, as seen in FIG. 14, the absorber is out of phase with the rest of the system. The operating frequency of the system falls at or near the minimum B as seen in FIG. 16.

In the Newington facility, the addition of a single 4,000 pound absorber constructed and attached to the system according to the present invention reduced the displacement of the bearing to near zero near the operating frequency. This result indicates that the use of four absorbers totalling 16,000 pounds will reduce the bearing displacement to near zero over a wider range of frequencies, as shown in FIG. 11. The force on the bearing caused by the unbalance of the rotor will be reduced by about 50%. The final result is achieved at far less expense than would be required to replace the concrete and steel foundation with one massive enough to achieve the same result.

I claim:
1. In combination with an unbalanced rotor supported on a shaft journaled in a bearing for rotation about an axis of rotation, said bearing being fixed to a foundation, said rotor having a generally fixed operating frequency of rotation, said rotor in operation exerting a periodic disturbing force on said foundation, the periodic displacement of said foundation responsive to said periodic disturbing force being primarily in one displacement direction and its amplitude approaching a maximum approximately at said rotor fixed operating frequency,
    a dynamic vibration absorber rigidly connected to said foundation and comprising:
        a vertical integral steel spring member having an upper spring portion, a fitting end portion, and a lower supporting portion of larger cross sec- tional area than said upper spring portion, rigidly mounted on said foundation, said fitting end portion being adapted to support a weight, a weight rigidly mounted on said spring member fitting end portion, said axis of rotation lying in a horizontal plane passing through said weight, said upper spring portion having a vertical dimension, a first horizontal dimension parallel with said displacement direction, and a second horizontal dimension perpendicular to said first horizontal dimension, said second horizontal dimension being at least three times as great as said first horizontal dimension, increasing the stiffness of said support spring portion for bending perpendicular to said displacement direction, said weight having a mass at least one-tenth that of the mass of said rotor, said weight and said spring dimensions being such that at said rotor operating frequency, said weight vibrates in said displacement direction, the amplitude of said vibration approaching a maximum at said rotor operating frequency, whereby said absorber at said rotor operating frequency exerts a periodic disturbing force on said foundation opposite in sense to that exerted by said rotor and thereby reduces the amplitude of said foundation periodic displacement.

2. The combination of claim 1, further including clamping means rigidly connecting said absorber lower supporting portion of said foundation, whereby the effective length of said upper spring portion is independent of small variations of said clamp position.

3. The combination of claim 1, said foundation comprising a steel pedestal, said bearing being supported on said pedestal, said clamping means comprising
a bracket plate,
a steel plate welded to said steel pedestal and including a plurality of threaded apertures to receive a plurality of bolts,
said bracket plate and said steel plate being adapted to receive said absorber support portion between them, and
a plurality of bolts passing through said bracket plate and past said support portion into said steel plate threaded apertures.

4. The combination of claim 1, said absorber weight including removable portions each having a mass of the order of 0.01 of the total mass of the weight, whereby the natural frequency of said absorber is tunable to within about 0.1 Hertz.

5. The combination of claim 1, wherein said axis of rotation lies in a horizontal plane passing through the center of mass of said weight.

6. The combination of claim 1, said spring member upper spring portion being generally rectangular in cross section.

7. The combination of claim 1, said spring member lower support portion being generally rectangular in cross section.

8. The combination of claim 1, said spring member fitting end portion including a generally cylindrical portion having a diameter greater than either of said spring portion horizontal dimensions, and said weight including a generally cylindrical bore, said weight being secured to said spring member fitting end by interference fit of said cylindrical portion within said bore.

9. A dynamic vibration absorber adapted to be rigidly connected to a foundation supporting an unbalanced rotor supported on a shaft journaled in a bearing for rotation about an axis of rotation, said bearing being fixed to said foundation, said rotor having a generally fixed operating frequency of rotation, said rotor in operation exerting a periodic disturbing force on said foundation, the periodic displacement of said foundation responsive to said periodic disturbing force being primarily in one displacement direction and its amplitude approaching a maximum approximately at said rotor fixed operating frequency, said dynamic vibration absorber comprising
a vertical integral steel spring member having an upper spring portion, a fitting end portion, and an enlarged lower supporting portion adapted to be rigidly mounted on said foundation, said fitting end portion being adapted to support a weight,
a weight rigidly mounted on said spring member fitting end portion, said axis of rotation lying in a horizontal plane passing through said weight,
said upper spring portion having a vertical dimension, a first horizontal dimension parallel with said displacement direction and a second horizontal dimension perpendicular to said displacement direction,
said second horizontal dimension being at least three times as great as said first horizontal dimension, thereby increasing the stiffness of said support spring portion for bending perpendicular to said displacement direction,
said weight and said spring dimensions being such that said weight is adapted to vibrate in said displacement direction at said rotor operating frequency, the amplitude of said vibration approaching a maximum at said rotor operating frequency,
whereby said absorber is adapted to exert at said rotor operating frequency a periodic disturbing force on said foundation opposite in sense to that exerted by said rotor and thereby to reduce the amplitude of said foundation periodic displacement.

10. The absorber of claim 9, said absorber weight including removable portions each having a mass of the order of 0.01 of the total mass of the weight, whereby the natural frequency of said absorber is tunable to within about 0.1 Hertz.

11. In combination with an unbalanced rotor supported on a shaft journaled in a bearing for rotation about an axis of rotation, said bearing being fixed to a foundation comprising a steel pedestal and concrete base, said bearing being supported on said pedestal, said rotor having a generally fixed operating frequency of rotation, said rotor in operation exerting a periodic disturbing force on said foundation, the periodic displacement of said foundation responsive to said periodic disturbing force being primarily in one displacement direction and its amplitude approaching a maximum approximately at said rotor fixed operating frequency, a dynamic vibration absorber rigidly connected to said foundation and comprising:
a vertical integral steel spring member having an upper spring portion, a fitting end portion, and a lower supporting portion of larger cross sectional area than said upper spring portion rigidly mounted on said foundation, said fitting end portion being adapted to support a weight and including a generally cylindrical portion, said spring member upper spring portion and lower support portion being generally rectangular in cross section, a weight rigidly mounted on said spring member fitting end portion, said axis of rotation lying in a horizontal plane passing through the center of mass at said weight, said weight including removable portions each having a mass of the order of 0.01 of the total mass of the weight, and including a generally cylindrical bore, said upper spring portion having a vertical dimension, a first horizontal dimension parallel with said displacement direction, and a second horizontal dimension perpendicular to said first horizontal dimension, said second horizontal dimension being at least three times as great as said first horizontal dimension, increasing the stiffness of said support spring portion for bending perpendicular to said displacement direction, said fitting end portion cylindrical portion having a diameter greater than either of said horizontal dimensions, said weight having a mass at least one-tenth that of the mass of said rotor, and being secured to said spring member by interference fit between said fitting end cylindrical portion and said weight cylindrical bore, said combination further including clamping means rigidly connecting said absorber lower supporting portion to said foundation, said clamping means comprising a bracket plate, a steel plate welded to said foundation steel pedestal and including a plurality of threaded apertures to receive a plurality of bolts, said bracket plate and said steel plate being adapted to receive said absorber support portion between them, and a plurality of bolts passing through said bracket plate and past said support portion into said steel plate threaded apertures, said weight and said spring dimensions being such that at said rotor operating frequency, said weight vibrates in said displacement direction, the amplitude of said vibration approaching a maximum at said rotor operating frequency, whereby said absorber at said rotor operating frequency exerts a periodic disturbing force on said foundation opposite in sense to that exerted by said rotor and thereby reduces the amplitude of said foundation periodic displacement.

12. A dynamic vibration absorber adapted to be rigidly connected to a foundation supporting an unbalanced rotor supported on a shaft journaled in a bearing for rotation about an axis of rotation, said bearing being fixed to a foundation comprising a steel pedestal and concrete base, said bearing being supported on said pedestal, said rotor having a generally fixed operating frequency of rotation, said rotor in operation exerting a periodic disturbing force on said foundation, the periodic displacement of said foundation responsive to said periodic disturbing force being primarily in one displacement direction and its amplitude approaching a maximum approximately at said rotor fixed operating frequency, said dynamic vibration absorber comprising:

a vertical integral steel spring member having an upper spring portion, a fitting end portion, and a lower supporting portion of larger cross sectional area than said upper spring portion rigidly mounted on said foundation, said fitting end portion being adapted to support a weight and including a generally cylindrical portion, said spring member upper spring portion and lower support portion being generally rectangular in cross section, a weight rigidly mounted on said spring member fitting end portion, said weight including removable portions each having a mass of the order of 0.01 of the total mass of the weight, and including a generally cylindrical bore, said upper spring portion having a vertical dimension, a first horizontal dimension parallel with said displacement direction, and a second horizontal dimension perpendicular to said first horizontal dimension, said second horizontal dimension being at least three times as great as said first horizontal dimension, increasing the stiffness of said support spring portion for bending perpendicular to said displacement direction, said fitting end portion cylindrical portion having a diameter greater than either of said horizontal dimensions, said weight having a mass at least one-tenth that of the mass of said rotor, and being secured to said spring member by interference fit between said fitting end cylindrical portion and said weight cylindrical bore, said weight and said spring dimensions being such that said absorber is adapted to be secured to said foundation steel pedestal in a position such that said axis of rotation lies in a horizontal plane passing through the center of mass of said weight, and such that said weight is adapted to vibrate at said rotor operating frequency in said displacement direction, the amplitude of said vibration approaching a maximum at said rotor operating frequency, whereby said absorber is adapted to exert at said rotor operating frequency a periodic disturbing force on said foundation opposite in sense to that exerted by said rotor and thereby to reduce the amplitude of said foundation periodic displacement.

13. In combination with an unbalanced rotor supported on a shaft journaled in two bearings for rotation about an axis of rotation, said bearings being fixed to a foundation, said rotor having a generally fixed operating frequency of rotation, said rotor in operation exerting a periodic disturbing force on said foundation, the periodic displacement of said foundation responsive to said periodic disturbing force being primarily in one displacement direction and its amplitude approaching a maximum at said rotor fixed operating frequency, a system of dynamic vibration absorbers as claimed in claim 8, rigidly connected to said foundation, the total mass of said absorber weights of said system being at least one-tenth that of the mass of said rotor, each said absorber weight and said spring dimensions of each said absorber being such that at said rotor operating frequency, each said weight vibrates in said displacement direction, the amplitude of said vibration approaching a maximum at said rotor operating frequency, whereby said system at said rotor operating frequency exerts a periodic disturbing force on said foundation opposite in sense to that exerted by said rotor and thereby reduces the amplitude of said foundation periodic displacement.

* * * * *